United States Patent Office — 2,813,877 — Patented Nov. 19, 1957

2,813,877

N-SUBSTITUTED BICYCLO-(2.2.1)-5-HEPTENE-2,3-DICARBOXIMIDES

Joseph A. Lambrech, Charleston, W. Va., assignor to Union Carbide Corporation, a corporation of New York No Drawing. Application September 7, 1954,
Serial No. 454,631

9 Claims. (Cl. 260—326)

This invention relates to new chemical compounds and their preparation. More particularly, the present invention relates to N-substituted bicyclo-(2.2.1)-5-heptene-2,3-dicarboximides in which the group attached to the nitrogen atom is an oxygen-interrupted carbon chain.

The compounds to which the present invention relates can be represented by the formula:

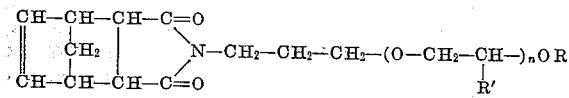

wherein R is an alkyl group containing from 1 to 10 carbon atoms, R' is a member selected from the class consisting of hydrogen and methyl radicals and n is an integer from 0 to 7 inclusive.

Representative examples of this class of compounds are N-(butoxyethoxypropyl) bicyclo-(2.2.1)-5-heptene-2,3-dicarboximide, N-(butoxydiethoxypropyl) bicyclo-(2.2.1)-5-heptene-2,3-dicarboximide, N-(butoxytriethoxypropyl) bicyclo-(2.2.1)-5-heptene-2,3-dicarboximide, N-(butoxypolyethyleneglycolpropyl) bicyclo-(2.2.1)-5-heptene-2,3-dicarboximide, N-(diethoxypropyl) bicyclo-(2.2.1)-5-heptene-2,3-dicarboximide, N-(2-ethylbutoxyethoxypropyl) bicyclo-(2.2.1)-5-heptene-2,3-dicarboximide, N-(2-ethylhexoxypropyl) bicyclo-(2.2.1)-5-heptene-2,3-dicarboximide, N-(2-ethylhexoxyethoxypropyl) bicyclo-(2.2.1)-5-heptene-2,3-dicarboximide, N-(hexoxypropyl) bicyclo-(2.2.1)-5-heptene-2,3-dicarboximide, N-(hexoxyethoxypropyl) bicyclo-(2.2.1)-5-heptene-2,3-dicarboximide, N-(hexoxydiethoxypropyl) bicyclo-(2.2.1)-5-heptene-2,3-dicarboximide, N-(hexoxytriethoxypropyl) bicyclo-(2.2.1)-5-heptene-2,3-dicarboximide, N-(hexoxypropoxypropyl) bicyclo-(2.2.1)-5-heptene-2,3-dicarboximide, N-(hexoxydipropoxypropyl) bicyclo-(2.2.1)-5-heptene-2,3-dicarboximide, N-(hexoxytripropoxypropyl) bicyclo-(2.2.1)-5-heptene-2,3-dicarboximide, N-(hexoxypolypropyleneglycolpropyl) bicyclo-(2.2.1)-5-heptene-2,3-dicarboximide, N-(isobutoxypropyl) bicyclo-(2.2.1)-5-heptene-2,3-dicarboximide, N-(isopropoxypropyl) bicyclo-(2.2.1)-5-heptene-2,3-dicarboximide, N-(methoxyethoxypropyl) bicyclo-(2.2.1)-5-heptene-2,3-dicarboximide, and N-(methoxybutoxyethoxypropyl) bicyclo-(2.2.1)-5-heptene-2,3-dicarboximide.

The compounds of my invention can be prepared by condensing bicyclo-(2.2.1)-5-heptene-2,3-dicarboxylic anhydride at a temperature of from about 100° C. to about 150° C. with an amine having the formula:

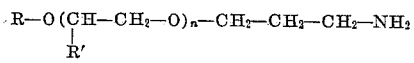

wherein R is an alkyl radical containing from 1 to 10 carbon atoms, R' is a member selected from the class consisting of hydrogen and methyl radicals and n is an integer from 0 to 7 inclusive.

Said amine can be prepared by the addition to acrylonitrile of a mono hydroxy alcohol followed by the hydrogenation of the acrylonitrile-alcohol addition product to its corresponding amine. The monohydroxy alcohol can be an alkanol having from one to ten carbon atoms to the molecule or an alkylene glycol monoalkyl ether such as the product obtained by the addition of from one to seven molecular proportions of ethylene oxide or propylene oxide to an alkanol having from one to ten carbon atoms to the molecule. The addition of the alkylene oxide to the alkanol can be carried out in known ways, for example at a temperature of from about 90° C. to about 125° C. in the presence of an alkali metal hydroxide catalyst. The addition of the alkanol or its alkylene oxide addition product to acrylonitrile and the hydrogenation of the resulting addition product can likewise be conducted according to known procedures.

The above described method of preparation can be represented by the following series of equations, wherein R is an alkyl group containing from 1 to 10 carbon atoms, R' is a member selected from the group consisting of hydrogen and methyl radicals and n is a number from 0 to 7 inclusive:

(1) 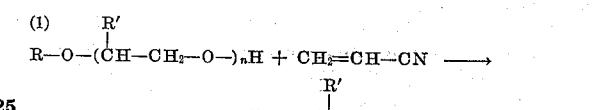

(2) 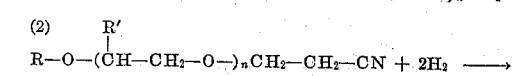

(3) 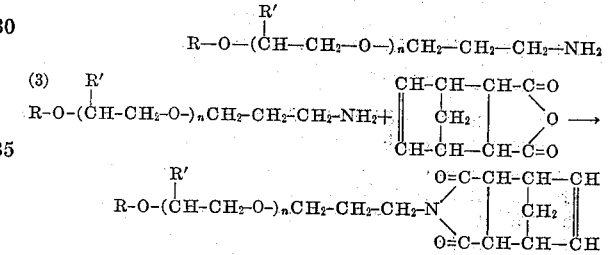

The following examples are illustrative.

EXAMPLE I

One hundred seventy-five parts (3.3 moles) of acrylonitrile were added to 438 parts (3 moles) of 2-hexoxyethanol to which had been added 2 parts of potassium hydroxide as catalyst, all by weight. During the addition the temperature was maintained at about 50° C. and continued for two hours thereafter, with stirring. The catalyst was then neutralized with phosphoric acid and the product distilled. There was obtained 530 grams (2.66 moles) of 3-(2-hexoxyethoxy)propionitrile distilling at a temperature of 132° C. at an absolute pressure of 5 millimeters of mercury. It is a colorless liquid insoluble in water.

A mixture of 530 parts (2.66 moles) of 3-(2-hexoxyethoxy)propionitrile prepared above, 500 parts of ethanol, 60 parts of Raney nickel and 200 parts of ammonia was heated at a temperature from about 60° C. to 100° C. and hydrogen added at a pressure which averaged 1000 pounds per square inch gauge for a period of about 2.5 hours. At the end of that time the catalyst was removed by filtration and the product distilled. There was obtained 435 parts (2.14 moles of 3-(2-hexoxyethoxy)propylamine distilling at a temperature of 123° C. at an absolute pressure of 5 millimeters of mercury. The specific gravity is 0.894 (20°/20° C.).

To a mixture of 82 parts (0.5 mole) of bicyclo-(2.2.1)-5-heptene-2,3-dicarboxylic anhydride in 300 parts of toluene was added slowly 112 parts (0.55 mole) of 3-(2-hexoxyethoxy)propylamine. A period of ten minutes was required for the addition. The reaction mixture was then heated at 160° C. until water no longer came off from the mixture. Upon distillation of the resulting product there was obtained 160 parts (0.46 mole) of N-3-(2-hexoxyethoxypropyl) bicyclo-(2.2.1)-5-heptene-2,3-dicarboximide which was a liquid boiling at a temperature of 205° C. at an absolute pressure of 2.5 millimeters of mercury. The compound was found to be soluble in the common organic solvents, such as ethanol, acetone, xylene, benzene, and kerosene, but not in water. It has a specific gravity of 1.066 (20°/20° C.) and a refractive index ($n_D^{30°\ C.}$) of 1.4832. The yield was 91 percent based on the bicycloheptenedicarboxylic anhydride.

EXAMPLE II

One hundred seventy-five parts (3.3 moles) of acrylonitrile were added to 354 parts (3 moles) of n-butanol to which had been added two parts of potassium hydroxide as catalyst, all by weight. During the addition the temperature was maintained at about 50° C. and continued for two hours thereafter, with stirring. The catalyst was then neutralized with phosphoric acid and the product distilled. There was obtained 317 grams (2.5 moles) of butoxypropionitrile distilling at a temperature of 88° C. at an absolute pressure of 10 millimeters of mercury. It had a specific gravity of 0.888 (20°/20° C.).

A mixture of 317 parts (2.5 moles) of butoxypropionitrile prepared above, 500 parts of ethanol, 60 parts of Raney nickel and 200 parts of ammonia was heated at a temperature from about 60° C. to 100° C. and hydrogen added at a pressure which averaged 1000 pounds per square inch gauge for a period of about 2.5 hours. At the end of that time the catalyst was removed by filtration and the product distilled. There was obtained 260 parts (2 moles) of butoxypropylamine distilling at a temperature of 104° C. at an absolute pressure of 76 millimeters of mercury. The specific gravity is 0.851 (20°/20° C.).

To a mixture of 82 parts (0.5 mole) of bicyclo-(2.2.1)-5-heptene-2,3-dicarboxylic anhydride in 300 parts of toluene was added slowly 72 parts (0.55 mole) of butoxypropylamine. A period of ten minutes was required for the addition. The reaction mixture was then heated at 160° C. until water no longer came off from the mixture. Upon distillation of the resulting product there was obtained 60 parts (0.4 mole) of butoxypropylbicycloheptenedicarboximide which was a liquid boiling at a temperature of 182° C. at an absolute pressure of 4 millimeters of mercury. The compound was found to be soluble in the common organic solvents, such as ethanol, acetone, xylene, benzene, and kerosene but not in water. It had a specific gravity of 1.090 (20°/20° C.). The yield was 80 percent based on the bicycloheptenedicarboxylic anhydride.

EXAMPLE III

One hundred seventy-five parts (3.3 moles) of acrylonitrile were added to 384 parts (3 moles) of 2-ethylhexanol to which had been added two parts of potassium hydroxide as catalyst, all by weight. During the addition the temperature was maintained at about 50° C. and continued for two hours thereafter, with stirring. The catalyst was then neutralized with phosphoric acid and the product distilled. There was obtained 470 grams (2.6 moles) of 2-ethylhexoxypropionitrile distilling at a temperature of 100° C. at an absolute pressure of 1.1 millimeters of mercury. It had a specific gravity of 0.876 (20°/20° C.).

A mixture of 470 parts (2.6 moles) of 2-ethylhexoxypropionitrile prepared above, 500 parts of ethanol, 60 parts of Raney nickel and 200 parts of ammonia was heated at a temperature from about 60° C. to 100° C. and hydrogen added at a pressure which averaged 1000 pounds per square inch gauge for a period of about 2.5 hours. At the end of that time the catalyst was removed by filtration and the product distilled. There was obtained 440 parts (2 moles) of 2-ethylhexoxypopylamine distilling at a temperature of 95° C. at an absolute pressure of 32 millimeters of mercury. The specific gravity is 0.848 (20°/20° C.).

To a mixture of 164 parts (1 mole) of bicyclo-(2.2.1)-5-heptene-2,3-dicarboxylic anhydride in 400 parts of toluene was added slowly 220 parts (1 mole) of 2-ethylhexoxypropylamine. A period of ten minutes was required for the addition. The reaction mixture was then heated at 160° C. until water no longer came off from the mixture. Upon distillation of the resulting product there was obtained 250 parts (0.8 mole) of 2-ethylhexoxypropylbicycloheptenedicarboximide which was a liquid boiling at a temperature of 210° C. at an absolute pressure of 3 millimeters of mercury. The compound was found to be soluble in the common organic solvents, such as ethanol, acetone, xylene, benzene, and kerosene but not in water. It had a specific gravity of 1.036 (20°/20° C.).

EXAMPLE IV

Sixty parts (1.1 moles) of acrylonitrile were added to 190 parts (1 mole) of hexoxyethoxyethanol to which had been added 1 part of potassium hydroxide as catalyst, all by weight. During the addition the temperature was maintained at about 50° C. and continued for two hours thereafter, with stirring. The catalyst was then neutralized with phosphoric acid and the product distilled. There was obtained 205 grams (0.85 mole) of hexoxyethoxyethoxypropionitrile distilling at a temperature of 130° C. at an absolute pressure of 2 millimeters of mercury.

A mixture of 120 parts (0.5 mole) of hexoxyethoxyethoxypropionitrile prepared above, 120 parts of ethanol, 20 parts of Raney nickel and 75 parts of ammonia was heated at a temperature from about 60° C. to 100° C. and hydrogen added at a pressure which averaged 1000 pounds per square inch gauge for a period of about 2.5 hours. At the end of that time the catalyst was removed by filtration and the product distilled. There was obtained 100 parts (0.4 mole) of hexoxyethoxyethoxypropylamine distilling at a temperature of 148° C. at an absolute pressure of 4 millimeters of mercury.

To a mixture of 82 parts (0.5 mole) of bicyclo-(2.2.1)-5-heptene-2,3-dicarboxylic anhydride in 250 parts of toluene was added slowly 136 parts (0.55 mole) of hexoxyethoxyethoxypropylamine. A period of ten minutes was required for the addition. The reaction mixture was then heated at 160° C. until water no longer came off from the mixture. Upon distillation of the resulting product there was obtained 148 parts (0.37 mole) of hexoxyethoxyethoxypropylbicycloheptenedicarboximide which was a liquid boiling at a temperature of 240° C. at an absolute pressure of 3 millimeters of mercury. The compound was found to be soluble in the common organic solvents, such as ethanol, acetone, xylene, benzene, and kerosene but not in water. It had a specific gravity of 1.068 (20°/20° C.).

EXAMPLE V

One hundred and forty parts (2.6 moles) of acrylonitrile were added to 320 parts (2 moles) of hexoxypropanol to which had been added 2 parts of potassium hydroxide as catalyst, all by weight. During the addition the temperature was maintained at about 50° C. and continued for two hours thereafter, with stirring. The catalyst was then neutralized with phosphoric acid and the product distilled. There was obtained 378 grams (1.7 moles) of hexoxypropoxypropionitrile distilling at a temperature of 125° C. at an absolute pressure of 4 millimeters of mercury.

A mixture of 378 parts (1.7 moles) of hexoxypropoxypropionitrile prepared above, 350 parts of ethanol, 40 parts of Raney nickel and 200 parts of ammonia was heated at a temperature from about 60° C. to 100° C. and hydrogen added at a pressure which averaged 1000 pounds per square inch gauge for a period of about 2.5 hours. At the end of that time the catalyst was removed by filtration and the product distilled. There was obtained 298 parts (1.37 moles) of hexoxypropoxypropionitrile distilling at a temperature of 92° C. at an absolute pressure of 2 millimeters of mercury.

To a mixture of 164 parts (1 mole) of bicyclo-(2.2.1)-5-heptene-2,3-dicarboxylic anhydride in 300 parts of toluene was added slowly 247 parts (1.1 moles) of hexoxypropoxypropylamine. A period of ten minutes was required for the addition. The reaction mixture was then heated at 160° C. until water no longer came off from the mixture. Upon distillation of the resulting product there was obtained 350 parts (0.9 mole) of N-(hexoxypropoxypropyl) bycycloheptenedicarboximide which was a liquid boiling at a temperature of 208° C. at an absolute pressure of 3 millimeters of mercury. The compound was found to be soluble in the common organic solvents, such as ethanol, acetone, xylene, benzene, and kerosene but not in water. It had a specific gravity of 1.053 (20°/20° C.).

EXAMPLE VI

Fifty-five parts (1.1 moles) of acrylonitrile were added to 260 parts (1 mole) of hexoxypolyethyleneglycol [1] to which had been added 2 parts of KOH as catalyst, all by weight. During the addition the temperature was maintained at about 50° C. and continued for two hours thereafter, with stirring. The catalyst was then neutralized with phosphoric acid and the product distilled. There was obtained 195 grams (0.5 mole) of residue product.

A mixture of 195 parts (0.5 mole) of hexoxypolyethyleneglycolpropionitrile, which is the residue product prepared above, 200 parts of ethanol, 50 parts of Raney nickel and 150 parts of ammonia was heated at a temperature from 60° C. to 100° C. and hydrogen added at a pressure which averaged 1000 pounds per square inch gauge for a period of about 2.5 hours. At the end of that time the catalyst was removed by filtration and the product distilled. There was obtained 150 parts (0.39 mole) of hexoxypolyethyleneglycolpropylamine.

To a mixture of 41 parts (0.25 mole) of bicyclo-(2.2.1)-5-heptene-2,3-dicarboxylic anhydride in 200 parts of toluene was added slowly 150 parts (0.39 mole) of hexoxypolyethyleneglycolpropylamine. A period of ten minutes was required for the addition. The reaction mixture was then heated at 160° C. until water no longer came off from the mixture. Upon distillation of the resulting product there was obtained 181 parts of hexoxypolyethyleneglycolpropylbicycloheptenedicarboximide which was a residue product. The compound was found to be soluble in the common organic solvents, such as ethanol, acetone, xylene, benzene, and kerosene but not in water. It had a specific gravity of 1.072 (20°/20° C.).

The N-substituted bicyclo-(2.2.1)-5-heptene-2,3-dicarboximides of my invention, characterized by the presence therein of an oxygen-interrupted chain attached to the nitrogen atom, have utility as synergists for insecticidally active compounds, such as pyrethrum, allethrin, cyclethrin and furethrin. A further description of the effectiveness of my compounds as synergists is to be found in Haynes application Serial No. 503,832, filed April 25, 1955, which is directed to insecticidal compositions. As far as is known, N-substituted bicyclo-(2.2.1)-5-heptene-2,3-dicarboximides which are lacking in the oxygen containing chain characteristic of my compounds are considerably less effective as synergists.

To illustrate the effectiveness of insecticidal compositions employing the compounds of my invention as synergists in fly spray compositions and to provide a comparison of the present compounds with the known dicarboximides, Tables I and II are presented below. The values shown in the tables were obtained by dissolving 30 mg. of allethrin and 1.0 ml. of the material to be tested per 100 ml. of fly spray base oil and then using the Official Peet-Grady large group test on houseflies. The results reported are a comparison of percentage knockdown and kill with that obtained by the Official Test Insecticide. The Official Test Insecticide contains 100 mg. of pyrethrins per 100 ml. of fly spray base oil.

Table I

BICYCLOHEPTENE DICARBOXIMIDES

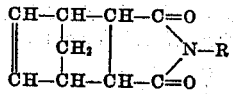

| R | Knockdown | Kill |
|---|---|---|
| N-(butoxydiethoxypropyl) | −6 | +11 |
| N-(butoxypropyl) | −2 | +7 |
| N-(butoxytriethoxypropyl) | −9 | +5 |
| N-(2-ethylbutoxyethoxypropyl) | −10 | +11 |
| N-(2-ethylhexoxyethoxypropyl) | −5 | +8 |
| N-(hexoxy propyl) | −1 | +10 |
| N-(hexoxyethoxypropyl) | −4 | +4 |
| N-(hexoxydiethoxypropyl) | −7 | +10 |
| N-(hexoxypolyethyleneglycol propyl) [1] | −2 | +6 |
| Do.[2] | −8 | 0 |
| N-(hexoxypropoxypropyl) | −6 | +8 |
| N-(hexoxydipropoxypropyl) | −8 | 0 |
| N-(hexoxytripropoxypropyl) | −8 | −3 |
| N-(isobutoxypropyl) | −2 | +6 |
| N-(isopropoxypropyl) | −5 | +5 |
| N-(methoxybutoxyethoxy-propyl) | −7 | +1 |

[1] The alcohol used in the preparation of this compound was prepared by reacting hexanol with an equimolar amount of polyethylene glycol containing 3 ethylene glycol groups.
[2] The alcohol used in the preparation of this compound was prepared by reacting hexanol with an equimolar amount of polyethylene glycol containing 5 ethylene glycol groups.

Table II

BICYCLOHEPTENE DICARBOXIMIDES

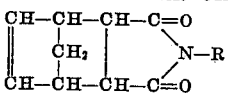

| R | Knockdown | Kill |
|---|---|---|
| N-(hydroxyethyl) | −21 | [1] −70 |
| N-(butyl) | −12 | +3 |
| N-(2-ethylhexyl) | −10 | +3 |
| N-(isobutyl-2,5-dimethylhexyl) | −18 | −25 |
| N-(2-methylcyclohexyl-methyl) | −24 | −25 |
| N-(alpha-methylbenzyl) | −23 | −20 |
| N-(1-methylhexyl) | −15 | −10 |
| N-(trimethylcyclohexyl) | −25 | −17 |
| N-(undecyl) | −39 | −15 |

[1] Tested at dosage of 250 mg. of 5991 and 25 mg. of allethrin per 100 ml. of base oil.

Table I clearly shows that my compounds are effective synergists for allethrin and are definitely superior to dicarboximides of Table II which lack an oxygen interrupted chain.

I claim:

1. An N-substituted bicyclo-(2.2.1)-5-heptene-2,3-dicarboximide of the general formula:

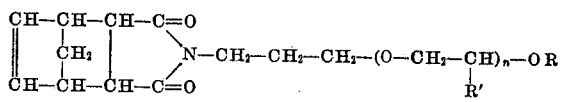

wherein R is an alkyl group containing from 1 to 10 carbon atoms, R' is a member selected from the class consisting of hydrogen and methyl radicals and $n$ is a number from 0 to 7 inclusive.

2. An N-substituted bicyclo-(2.2.1)-5-heptene-2,3-dicarboximide of the general formula:

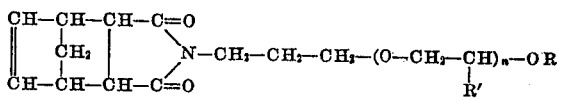

wherein R is an alkyl group containing from 1 to 10 car-

[1] Formed by reacting hexanol with polyethylene glycol containing 5 ethylene glycol groups.

bon atoms, R' is a hydrogen, and $n$ is a number from 0 to 7 inclusive.

3. An N-substituted bicyclo-(2.2.1)-5-heptene-2,3-dicarboximide of the general formula:

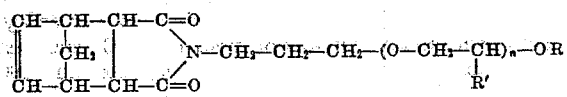

wherein R is an alkyl group containing from 1 to 10 carbon atoms, R' is a methyl radical, and $n$ is a number from 0 to 7 inclusive.

4. An N-substituted bicyclo(2.2.1)-5-heptene-2,3-bicarboximide of the general formula:

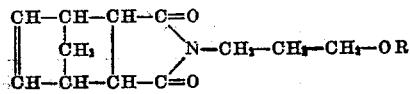

wherein R is an alkyl group containing from 1 to 10 carbon atoms.

5. N-(hexoxyethoxypropyl) bicyclo-(2.2.1)-5-heptene-2,3-dicarboximide.

6. N-(butoxypropyl) bicyclo-(2.2.1)-5-heptene-2,3-dicarboximide.

7. N-(2-ethylhexoxypropyl) bicyclo (2.2.1)-5-heptene-2,3-dicarboximide.

8. N - (hexoxytriethoxypropyl) bicyclo - (2.2.1) - 5-heptene-2,3-dicarboximide.

9. N - (hexoxypropoxypropyl) bicyclo - (2.2.1) - 5-heptene-2,3-dicarboximide.

No references cited.